US009521815B2

United States Patent
Panopoulos et al.

(10) Patent No.: US 9,521,815 B2
(45) Date of Patent: Dec. 20, 2016

(54) CONTAINER (75) Inventors: Greg Panopoulos, Keilor (AU); Daniel Leonardo, Bellfield (AU)

(73) Assignee: Nutrifield Pty Ltd, Sunshine West, Victoria (AU)

( * ) Notice: Subject to any disclaimer, the term of this patent is extended or adjusted under 35 U.S.C. 154(b) by 39 days.

(21) Appl. No.: 13/990,714

(22) PCT Filed: Apr. 11, 2012

(86) PCT No.: PCT/AU2012/000369
§ 371 (c)(1),
(2), (4) Date: Dec. 10, 2013

(87) PCT Pub. No.: WO2012/139158
PCT Pub. Date: Oct. 18, 2012

(65) Prior Publication Data
US 2014/0083009 A1 Mar. 27, 2014

(30) Foreign Application Priority Data

Apr. 11, 2011 (AU) ................................ 2011901359

(51) Int. Cl.
*A01G 31/00* (2006.01)
*A01G 31/06* (2006.01)
*A01G 9/02* (2006.01)

(52) U.S. Cl.
CPC ................. *A01G 31/06* (2013.01); *A01G 9/02* (2013.01); *Y02P 60/216* (2015.11)

(58) Field of Classification Search
CPC ........ A01G 9/02; A01G 31/06; B65D 21/046; B65D 21/045; B65D 21/043; B65D 21/041; B65D 21/04; B65D 21/0233; B65D 21/0235; B65D 21/02
(Continued)

(56) References Cited

U.S. PATENT DOCUMENTS 3,326,410 A * 6/1967 Asenbauer .................... 206/504
3,734,341 A * 5/1973 Levenhagen ........ B65D 21/045
206/507
(Continued)

FOREIGN PATENT DOCUMENTS

WO WO03/062098 A1 7/2003

OTHER PUBLICATIONS

Australian Examination Report No. 1 dated Sep. 24, 2015, issued in Australian Application No. 2012243428, filed Apr. 11, 2011.
(Continued)

*Primary Examiner* — Kristen C Hayes
*Assistant Examiner* — Ebony Evans
(74) *Attorney, Agent, or Firm* — Knobbe, Martens, Olson & Bear, LLP (57) ABSTRACT

A container for stacking with an alike container for use in hydroponics, the container includes a base and a side wall extending from the base and defining an opening, the side wall having an inner profile and an outer profile, the inner profile interfits with the outer profile when the container is in a stacked relationship with an alike container, and wherein the inner profile includes at least one formation located at a height from the base of the container, and the outer profile includes at least one abutment for engaging the formation of an alike container when stacked therein, and when in use, the container can be stacked with an alike container in a nesting relationship such that one container forms a receiver and the other forms a nester that is positioned in a lowered operative position within a receiver, and the relative positions of the containers can be adjusted by locating the at least one abutment of the outer profile of the nester on the at least one formation of the receiver and thereby supporting the nester in an raised operative position.

23 Claims, 5 Drawing Sheets (58) Field of Classification Search
USPC ....... 47/60, 62 R, 65.5, 66.5, 66.6, 66.7, 75; 206/507, 505, 504, 503; 220/4.27, 4.26, 220/23.86, 23.83
See application file for complete search history.

(56) References Cited

U.S. PATENT DOCUMENTS

| | | | | |
|---|---|---|---|---|
| 3,800,469 | A * | 4/1974 | Lau et al. .................... | 47/65.5 |
| 4,000,817 | A * | 1/1977 | Sanders .............. | B65D 21/041 |
| | | | | 206/505 |
| RE29,320 | E * | 7/1977 | Kalata et al. ............... | 206/519 |
| 4,316,540 | A * | 2/1982 | Lapham ...................... | 206/507 |
| 4,510,712 | A * | 4/1985 | Whitcomb .................. | 47/65.5 |
| 4,577,759 | A * | 3/1986 | Kreeger .............. | B65D 21/041 |
| | | | | 206/505 |
| 4,715,144 | A * | 12/1987 | Lee ............................. | 47/66.6 |
| 5,010,687 | A * | 4/1991 | Hougard ..................... | 47/79 |
| D320,298 | S * | 9/1991 | Apps ........................... | D3/312 |
| 5,327,679 | A * | 7/1994 | Hawthorne ................. | 47/73 |
| D356,211 | S * | 3/1995 | Apps ........................... | D3/304 |
| 5,702,001 | A * | 12/1997 | Russell ................ | B65D 7/26 |
| | | | | 206/388 |
| 5,761,848 | A * | 6/1998 | Manlove ..................... | 47/65.5 |
| 7,575,181 | B2 * | 8/2009 | Weemhoff ........... | B05B 17/085 |
| | | | | 206/497 |
| 7,837,037 | B2 | 11/2010 | Mctavish et al. | |
| 7,954,277 | B2 * | 6/2011 | Cooley ........................ | 47/73 |
| 2006/0180491 | A1 | 8/2006 | Zephir et al. | |
| 2008/0216403 | A1 | 9/2008 | Schmidt et al. | |
| 2010/0218422 | A1 | 9/2010 | Eckert | |

OTHER PUBLICATIONS

Extended European Search Report dated Aug. 28, 2014, issued in International Application No. PCT/AU2012/00369, filed Apr. 11, 2012.
International Search Report dated May 4, 2012, issued in Int'l Application No. PCT/AU2012/000369, filed Apr. 11, 2012.

* cited by examiner

CONTAINER

CROSS-REFERENCE TO RELATED APPLICATIONS

This application is a national phase application of International Application No. PCT/AU2012/000369, filed Apr. 11, 2012, which claims priority to Australian Application No. 2011901359, filed Apr. 11, 2011, which are both incorporated by reference herein in their entirety.

FIELD OF THE INVENTION

The present invention relates to a container for hydroponics.

BACKGROUND OF THE INVENTION

Hydroponics is a method of growing plants in a soilless environment using nutrient solution. Optimal plant growth in hydroponics often involves regulating the nutrient solution level and the amount of light a plant receives.

The nutrient solution is typically stored in a reservoir while the plants are held in a separate receptacle containing a growth medium. Typically, the receptacle is partially immersed in the reservoir to expose the plant roots to the solution.

It can be appreciated that the level that the medium is immersed in the nutrient solution has to be adjusted during plant growth, particularly when the roots are developing. This is important as saturation with nutrient solution reduces aeration of the roots and may stunt root growth.

As the plant grows, the amount of light also has to be regulated to ensure optimal growth of the plant.

Additionally, different growing styles and/or media may require the level of medium immersion in the nutrient solution to be adjustable to accommodate variables including nutrient solution volume and root aeration.

Hydroponic farms often have large reservoirs and static light sources which reduce portability and make it difficult or cumbersome to adjust the distance of the plants to the light source, particularly, when the plants are at different stages of growth.

SUMMARY OF THE DISCLOSURE

The present invention relates to a container for stacking with an alike container for use in hydroponics, the container includes:

a base; and a side wall extending from the base and defining an opening, the side wall having an inner profile and an outer profile, the inner profile interfits with the outer profile when the container is in a stacked relationship with an alike container, and wherein the inner profile includes at least one formation located at a height from the base of the container, and the outer profile includes at least one abutment for engaging the formation of an alike container when stacked therein, and when in use, the container can be stacked with an alike container in a nesting relationship such that one container forms a receiver and the other forms a nester that is positioned in a lowered operative position within a receiver, and the relative positions of the containers can be adjusted by locating the at least one abutment of the outer profile of the nester on the at least one formation of the receiver and thereby supporting the nester in an raised operative position.

Reference to a nester in the specification refers to a first container (i.e. the nester) that is received by a second container (i.e. the receiver), such that the first container nests in the second container. On the other hand, reference to a receiver in the specification refers to a container that does not nest in another container. For example, a system comprising three stacked containers comprises one receiver acting as a fluid reservoir, and two receivers, wherein one of the receivers holds the plant.

When the container is a receiver, it may act as a fluid reservoir for water, nutrient solution and the like. When the container is a nester, it may contain growth medium and plants. The growth medium serves to support a plant, particularly the roots of the plant. The growth medium may also provide nutrients to the plant. The operative positions allow adjustment of the growth medium immersion level in the fluid without having to remove the contents of the container that acts as a nester.

In an embodiment, the inner profile of a container complements/interfits with the outer profile of the same or alike container when the containers are nested.

In an embodiment, the at least one formation includes a groove, rib, threading, step and the like to engage with at least one abutment, when stacked with the same or an alike container in an operative position. Suitably, the at least one formation is integrally formed with the container. More suitably, the at least one formation comprises spaced intrusions about the circumference of the side wall. Even more suitably, the spaced intrusions have different heights relative to the base of the container.

In an embodiment, the at least one intrusion includes any one of a groove, rib, threading, or step that engages the at least one abutment when stacked with an alike container in an operative position.

In an embodiment, the container includes two formations, wherein a first formation is located intermediate to the base of the container and the opening of the container and a second formation is located intermediate to the first formation and the opening of the container. Suitably, the inner profile comprises the first and second formations consecutively arranged about the side wall of the container. More suitably, the inner profile comprises the first and second formations consecutively arranged about the side wall of the container at 45° increments to each other.

In an embodiment, the at least one abutment includes any one of a groove, rib, threading or step that is engaged by the at least one formation when nested in an operative position. Suitably, the at least one abutment is integrally formed with the container. More suitably, each abutment includes a downwardly facing surface when the container is viewed in an upright orientation and a lip formation extending downwardly from an outer portion of the abutment. For example, the lip formation may extend from the downwardly facing surface to define an overhang which receives that formation. In another example, the formation and abutment have co-operating male and female configuration that interfit so as to prevent the container that acts as a nester from rotating relative to the container that acts as a receiver while nested in an operative position. Examples of male and female configurations include a protrusion, such as a nib, and a recess that receives the protrusion. Alternatively, the downwardly facing surface is a protrusion.

In an embodiment, the container includes two abutments, wherein a first abutment is located intermediate to the base of the container and the opening of the container and a second abutment is located intermediate to the first abutment and the base of the container. Suitably, the second abutment is located at or close to the base of the container.

In an embodiment, the outer profile comprises the first and second abutments consecutively arranged about the side wall of the container. Suitably, the first abutment is paired with the second abutment to define an arrangement wherein the first and second abutments are located immediately adjacent to each other. More suitably, the outer profile comprises four pairs of the first and second abutments spaced at 90° increments to each other about the side wall of the container.

In an embodiment, the first abutment is configured to interfit with either the first or second formations to prevent rotation of the container that acts as a nester relative to the container that acts as a receiver. The first abutment and the first or second formation can be disengaged by lifting the container that acts as a nester in an axial direction from the container that acts as a receiver.

In an embodiment, the second abutment is configured to interfit with the second formation to prevent rotation of the container that acts as a nester relative to the container that acts as a receiver. The second abutment and the second formation can be disengaged by lifting the container that acts as a nester in an axial direction from the container that acts as a receiver.

In an embodiment, the first formation is configured to interfit with the first abutment to prevent rotation of the container that acts as a nester relative to the container that acts as a receiver. The first formation and the first abutment can be disengaged by lifting the container that acts as a nester in an axial direction from the container that acts as a receiver.

In an embodiment, the second formation is configured to interfit with either the first or second abutments to prevent rotation of the container that acts as a nester relative to the container that acts as a receiver. The second formation and the first or second abutments can be disengaged by lifting the container that acts as a nester an axial direction from the container that acts as a receiver.

In an embodiment, the container includes pots, pails, buckets, trays, tanks or the like.

In an embodiment, the container is water-tight and is a receiver.

In an embodiment, the container includes openings such as perforations and the like to permit drainage and is a nester.

The container may include adjustable openings that may be opened and closed to allow the container to change between watertight for use as the receiver or non-watertight for use as the nester.

In this embodiment, the openings are closed for holding fluid such as water, nutrient solution or the like. In which case, the container acts as a receiver.

In this embodiment, the openings are open to permit drainage. In which case, the container acts as a nester.

The adjustable openings are operable to change the amount of perforation in the container ranging from 0-70% of the area of the base. Suitably, the amount of perforation in the container ranges from 30-60% of the area of the base.

The adjustable openings may closable using removable stoppers to block the perforations or a slidable platform to control the amount of perforation.

In an embodiment, the container that acts as a nester includes a plurality of openings such as perforations and the like to permit drainage. Suitably, the perforations are located at the base of the container that acts as a nester. More suitably, the perforations are in the form of grates, holes, slots or the like. Even more suitably, at least 40% of the base of the container that acts as a nester is perforated. Yet even more suitably, 60% of the base of the container that acts as a nester is perforated.

The perforations allow for rapid drainage while holding different types of growth medium such as coir, expanded clay, perlite or the like. Drainage may also be enhanced by including a dished base which allows solution run off to the edge of the base of the container that acts as a nester. The perforations also make the container that acts as a nester suitable for deep water culture and permit roots to grow through.

In an embodiment, movement of the containers between operative positions is effected by relative rotation between the container that acts as a nester about an axial direction of the container that acts as receiver, and an adjustment along the axial direction of the container that acts as a receiver.

The height selection afforded by the operative positions allows adjustment of variables such as the amount of fluid, root aeration and drainage to optimise plant growth. The selection also allows the system to adapt to different growing styles such as flood and drain, deep water culture, satellite system, etc. Additionally, the selection allows for varying levels of medium immersion in the fluid and fluid storage in the container that acts as receiver.

In an embodiment, locating the at least one abutment onto the at least one formation allows the container that acts as a nester to be stacked at at least one operative position within the container that acts as a receiver.

In an embodiment, locating at least two abutments onto at least two formations allows the container that acts as a nester to be stacked at at least two operative positions within the container that acts as a receiver.

A lowered operative position is defined when the first formation of a container that acts as a receiver is aligned but not engaged with the first abutment of a container that acts as a nester, such that there is minimal separation between the two container bases. Each container rim may or may not contact with each other when the container that acts as a nester and the container that acts as a receiver are in a lowered operative position.

In an embodiment, a lowered operative position is defined when the first abutment of the container that acts as a nester engages or interfits with the first formation of the container that acts as a receiver.

The container that acts as a nester can be elevated to a raised operative position which includes an intermediate operative position and an upper operative position.

An intermediate operative position is defined when the first abutment of a container that acts as a nester locates onto the second formation of a container that acts as a receiver.

In an embodiment, an intermediate operative position is defined when the first abutment of the container that acts as a nester engages or interfits with the second formation of the container that acts as a receiver.

An upper operative position is defined when the container that acts as a nester is further raised from the intermediate operative position such that the second abutment of the container that acts as a nester locates onto the second formation of a container that acts as a receiver for maximum separation between the container bases.

In an embodiment, an upper operative position is defined when the second abutment of the container that acts as a nester engages or interfits with the second formation of the container that acts as a receiver.

Correspondingly, the container that acts as a nester can be moved from the upper operative position into either the intermediate or lowered operative positions by orienting an abutment with respect to a formation.

At a fixed fluid level in the container that acts as a receiver, positioning the container that acts as a nester at the lowered operative position may allow growth medium in the container to be fully saturated while positioning the container at the upper operative position lifts the growth medium from the fluid. The upper operative position may allow drainage of the growth medium. The intermediate operative position may allow partial immersion of the growth medium in the fluid.

Alternatively, the upper operative position may allow storage of an increased volume of fluid while maintaining partial or complete immersion of the growth medium.

In an embodiment, the container that acts as a receiver includes an outlet to allow flow of fluid out of the container. Suitably, the container that acts as a receiver includes an inlet and an outlet to allow flow of fluid through the container.

Alternatively, the container that acts as a nester includes an inlet to allow flow of fluid through the growth medium and exiting through an outlet on the container that acts as a receiver. Suitably, the inlet is connected to a feeder ring.

These arrangements allow connection of multiple assemblies to form a network, wherein fluid can be circulated around the network from a main fluid reservoir. The network may allow simultaneous drainage of containers that act as receivers of the network.

In an embodiment, the base of the container is dished to improve drainage by allowing fluid run off to the edge of the base where the fluid drains.

In an embodiment, location of the at least one formation onto the at least one abutment allows a container that acts as a nester to be stacked into a container that acts as a receiver without a friction grip between the containers.

The design enables a person to easily adjust the height of the container that acts as a nester within the container that acts as a receiver and avoids the need for a person to exert additional strength to unwedge the container that acts as a nester from the container that acts as a receiver. This is significant when the containers are filled and are more difficult to manoeuvre.

In an embodiment, the container is made of lightweight material such as polypropylene, aluminium or the like to improve portability.

It can be appreciated that the container may also be made of other material such as ceramics, steel or the like.

The container may be formed using processes such as injection moulding, vacuum forming, rotational moulding, casting, stamping or the like, such that a protrusion of the inner profile of the container forms a complementary intrusion on the outer profile of the same container to form interfitting surfaces.

In an embodiment, the container includes a support to elevate the container from the ground. Suitably, the support is a stand. More suitably, the support is a similar container to a container that acts as either a receiver or a nester with its base removed to receive a container that acts as a receiver.

The support lifts the container to an appropriate working height allowing a person to tend to the plants without having to bend over at awkward positions to minimise physical injuries. The support also ensures fluid run off after feeding or drainage flows back to the main reservoir for improved fluid circulation, nutrient dosing or metering when the containers are connected in a network.

BRIEF DESCRIPTION OF DRAWINGS

A preferred embodiment of the present invention is hereinafter described by way of example only, with reference to the following accompanying drawings.

DETAILED DESCRIPTION

A container is classified as either as a nester or a receiver depending on the presence/absence of openings which control drainage.

In the examples provided, the openings of the container acting as a nester are not closable. However, other embodiments of the invention may include adjustable openings that may be opened and closed to allow the container to change between watertight for use as the receiver or non-watertight for use as the nester.

One form of a container includes a base wall and a side wall extending from base wall and defining an opening to receive and hold fluid such as nutrient solution, water and the like.

The side wall has an inner profile and an outer profile, wherein the inner profile interfits with the outer profile of a container acting as a nester when the nester is in a stacked relationship with a container acting as a receiver.

The inner profile includes at least one formation 36 and 40 located at a height from the base of the container, and the outer profile includes at least one abutment 48 and 52 for engaging the formation of an alike container when stacked therein. When in use, the container can be stacked with an alike container in a nesting relationship such that one container forms receiver 14 and the other forms nester 12 that is positioned in a lowered operative position within receiver 14, and the relative positions of the containers can be adjusted by locating the at least one abutment 48 and 52 of the outer profile of nester 12 on the at least one formation 36 and 40 of receiver 14 and thereby supporting the nester in an raised operative position.

Figure 1:
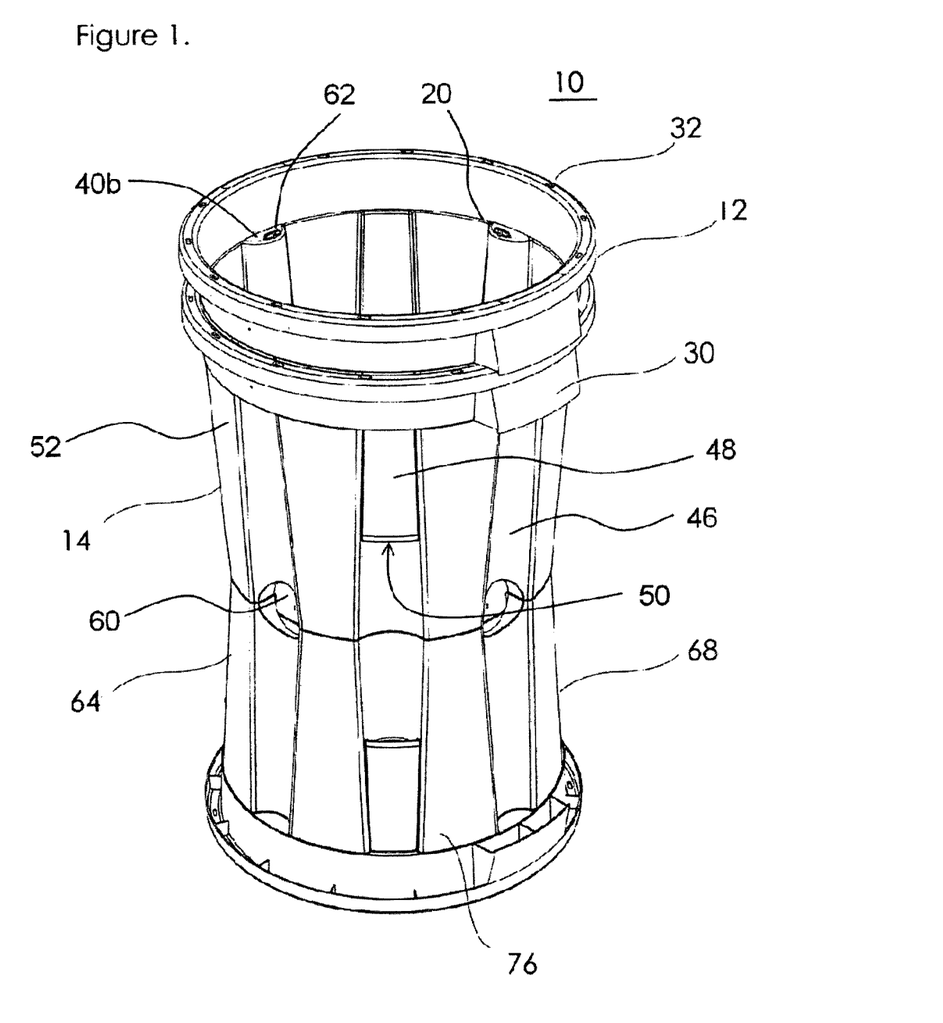
FIG. 1 is an isometric view of two containers in which one container, the nester, is located insider another container, the receiver, and in which the nester is located in a lowered operative position within the receiver and the receiver is resting on a support.

One form of the containers when in use is denoted as 10 in FIG. 1.

The containers comprise of nester 12 for containing plants and growth medium, and receiver 14 for containing fluid such as nutrient solution and receiving nester 12. Both containers are produced by injection moulding of polypropylene but may be made using other materials such as ceramics or metals. Receiver 14 rests on stand 64 which elevates the containers from the ground.

Figure 2:
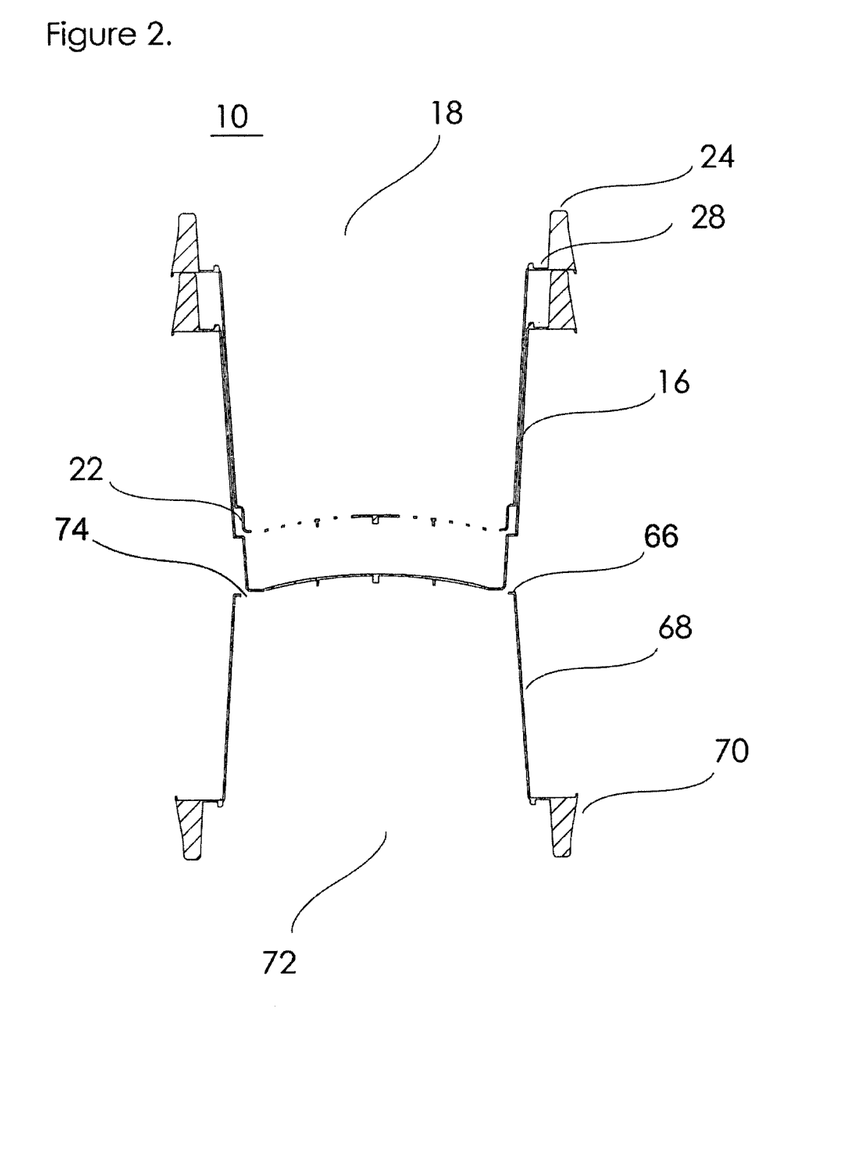
FIG. 2 is a cross-sectional view of FIG. 1.
Figure 3:
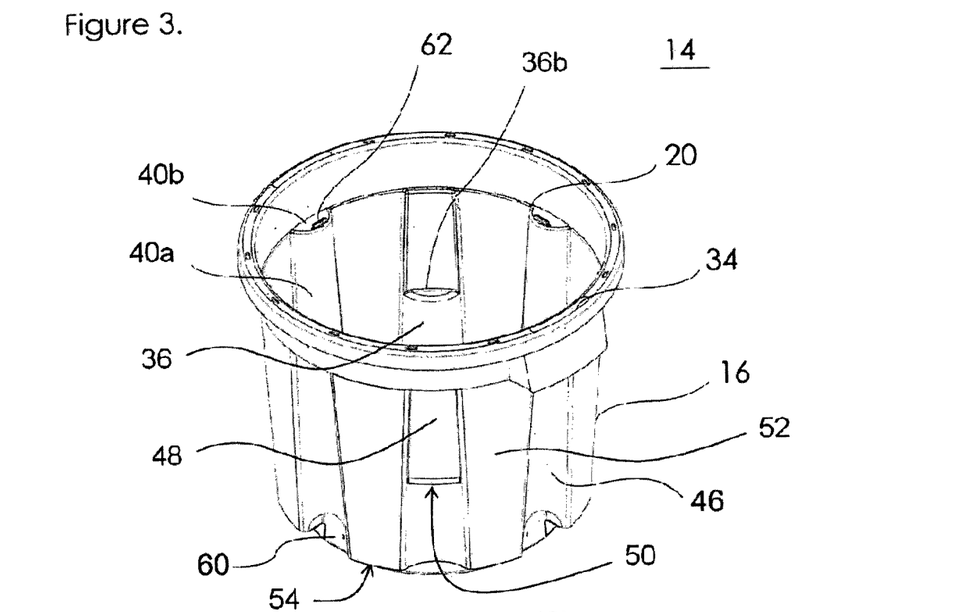
FIG. 3 is an isometric view of the receiver of FIG. 1.

Both containers have a substantially cylindrical form that includes a substantially contiguous side wall 16 and an opening 18. The side wall includes a rim, support step portion 20 and base portion 22. The rim comprises upper rim portion 24 and rim step portion 28 (FIG. 2).

Base portion 22 of receiver 14 includes a plurality of hose attachment elements 60 located immediately beneath each channel groove 46. The hose attachment elements are located on base portion 22 to receive hose attachment fittings.

Fluid can be fed from a central reservoir to a network of receivers through hose attachment elements 60 or alternatively, fluid can be fed to feeder rings located in the nesters and exiting through the hose attachment fittings on base portion 22 of the receiver.

The inner profile of receiver 14 includes formations comprising two longitudinally extending intrusions arranged in a circular array.

First formation 36 runs longitudinally about halfway along side wall 16 and comprises cylindrical intrusion 36*a* and step 36*b* at the apex of cylindrical intrusion 36*a*. First intrusion 36 has a height intermediate to the base of the container and opening 18 of the container, whereby the height of the intrusions is defined by the distance between step 36*b* and base portion 22. First formation 36 is arranged at 90° increments such that four identical first formations are evenly spaced around the inner surface of the container.

Figure 4:
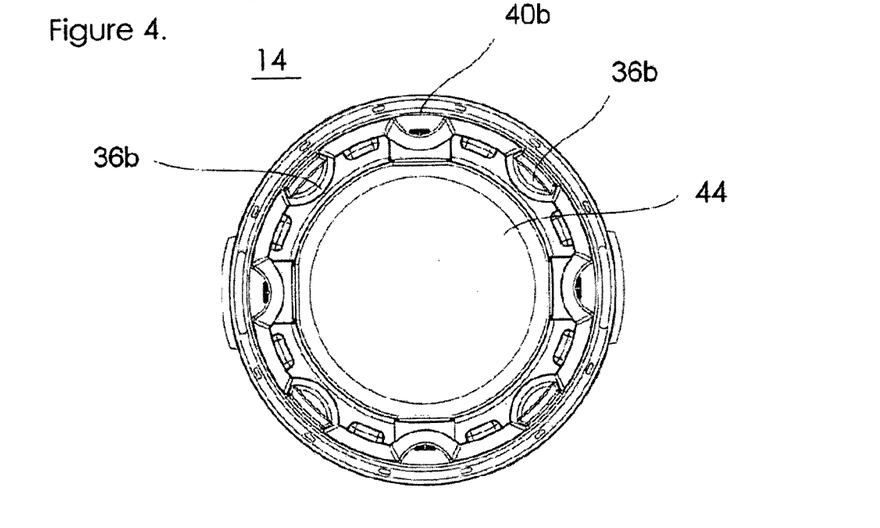
FIG. 4 is a top view of the receiver in FIG. 1.

Second formation 40 has a different height to first formation 36 and runs substantially along the length of side wall 16. Second formation 40 comprises cylindrical intrusion 40*a* and step 40*b* which is an extension of rim step portion 28. Second formation 40 has a height intermediate to the height of first formation 36 and opening 18 of the container, whereby the height of second formation 40 is the distance from step 40*b* to base portion 22. Step 40*b* is suitable to support some of the weight of the container and its contents. Second formation 40 is also located at 90° increments to each other such that four identical second formations are evenly spaced around the inner surface of the container. The inner profile defines an overall arrangement whereby both first and second formations are consecutively arranged at 45° increments around the inner surface of side wall 16 (FIG. 4). Advantageously, the formations impart increased strength to the containers to allow them to withstand compressive forces when stacked together.

Base wall 44 of the base of receiver 14 is water-tight to contain fluid for absorption by the growth medium (FIG. 4). However, base wall 44 may include removable stoppers or a slidable platform to enable receiver 14 to be converted into a nester.

In this embodiment, nester 12 does not include hose attachment element 60 located immediately beneath each channel groove 46. However, it can be appreciated that hose attachment 60 may be present in other embodiments of the invention.

During assembly, the outer profile of nester 12 interfits with the inner profile of receiver 14 (FIG. 2).

Figure 5:
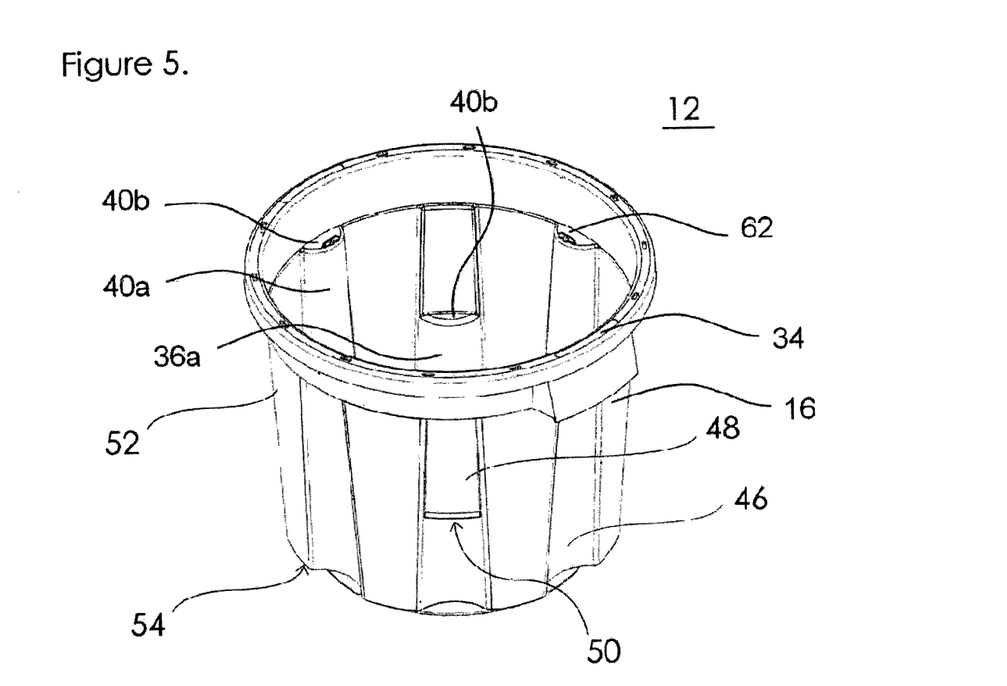
FIG. 5 is an isometric view of the nester of FIG. 1.

The external surface of nester 12 is essentially complementary to its inner surface. In this regard, the second formation 40 is associated with complementary channel groove 46 that runs substantially along the length of the external surface of side wall 16 (FIG. 5).

The outer profile of nester 12 comprising two longitudinally extending abutments 48 and 52 arranged in a circular array.

First abutment 48 runs longitudinally about halfway along side wall 16 and includes downwardly facing surface 50. First abutment 48 has a height intermediate to the base of the container and opening 18 of the container, whereby the height of first abutment 48 is defined by the distance between downwardly facing surface 50 and rim step portion 28. The first abutment is arranged at 90° increments such that four identical first abutments are evenly spaced around the outer surface of side wall 16 (FIG. 6).

Second abutment 52 has a different height to the first abutment and runs substantially along the length of side wall 16. The second abutment includes downwardly facing surface 54. Second abutment 52 has a height intermediate to the height of first abutment 48 and opening 18 of the container, whereby the height of second abutment 52 is defined by the distance between downwardly facing surface 54 and rim step portion 28.

Each first abutment 48 is paired with each second abutment 52 to define an arrangement wherein each abutment pair comprising first abutment 48 and second abutment 52 locate immediately adjacent to each other.

Figure 6:
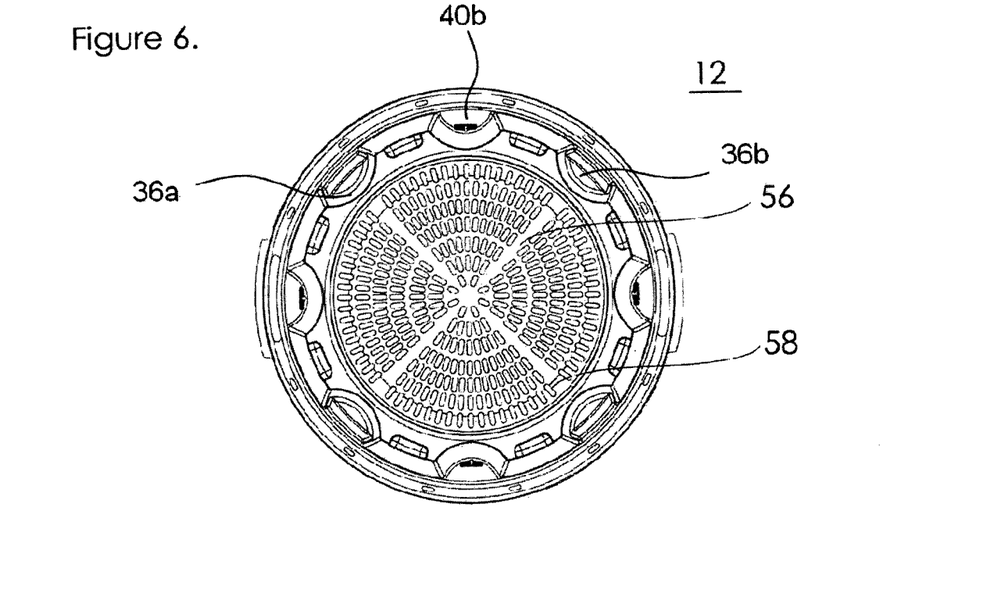
FIG. 6 is a top view of the nester of FIG. 1.

The external surface of side wall 16 of nester 12 possesses a design whereby channel grooves 46 separate each pair of abutments such that each container possesses four channel grooves 46 and four pairs of abutments consecutively arranged about side wall 16 at 45° increments (FIG. 6).

The base of nester 12 comprises of base portion 22 and dished base wall 56 which contains a plurality of radially arranged holes 58 to allow fluid to pass easily through the holes while the growth medium and plants are retained within the container. Each hole has a length of 4-5 mm and about 40% of the base wall is covered by the holes. The base wall also includes radial and cross ribs for reinforcement (not shown). In other embodiments, the number and size of holes can be selected to optimise drainage rates. The number and size of holes (i.e. the amount of perforation) can be adjusted using removable stoppers or a slidable platform.

During assembly, orientation of abutments 48 and 52 of nester 12 with respect to formations 40 and 36 of receiver 14 creates three operative positions that nester 12 can be stacked onto receiver 14. Advantageously, the height adjustment can be achieved without removing the contents of the containers.

Figure 7:
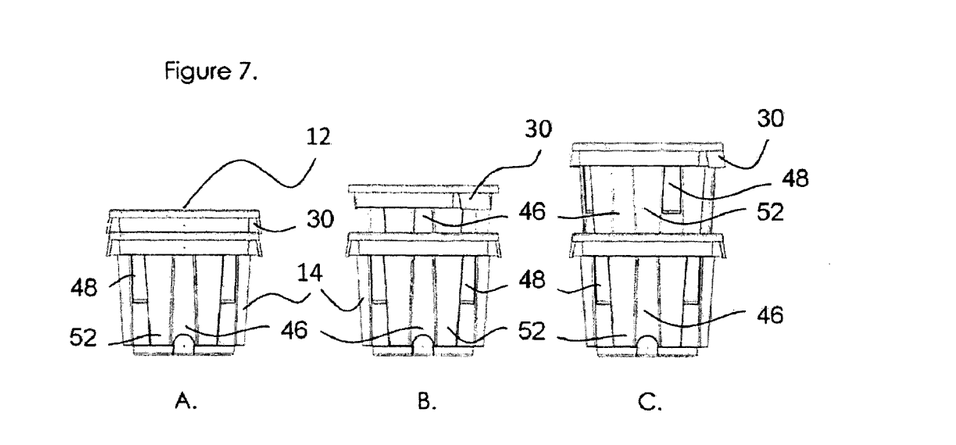
FIG. 7 is a set of side views of the nester and the receiver arranged at various operative positions.

At the lowered operative position, channel grooves 46 of nester 12 are interfitted with complementary cylindrical intrusions 40*a* of receiver 14 to form an arrangement illustrated in FIG. 7A, wherein the separation between the containers is at a minimum. In the lowered operative position, the available volume of receiver 14 for holding fluid, the volume defined by the space between the base of nester 12 and the base of receiver 14, is at a minimum.

The interfitting of channel grooves 46 and cylindrical intrusions 40*a* prevents rotation of nester 12 within receiver 14. In this arrangement, handle elements 30 of both nester and receiver are either aligned with each other (as shown in FIG. 7A) or offset to each other by 90° and nester 12 is held in receiver 14 by a friction grip. In this position, rim step portion 28 of nester 12 may contact upper rim portion 24 of receiver 14.

At the intermediate operative position, nester 12 is rotated 45° where first abutment 48 is located on step 40*b* of receiver 14, wherein downwardly facing surface 50 receives nib 62 of receiver 14. In this embodiment, downwardly facing surface 50 is housed by a lip of first abutment 48 to accommodate nib 62 behind the lip. The interfitting of cylindrical intrusion 40*a* and first abutment 48 prevents rotation of nester 12 within receiver 14. In this orientation, handle element 30 of nester 12 is offset to the handle element of receiver 14 by 45° (FIG. 7B).

At the upper operative position, nester 12 is rotated 22.5° from either the lower or intermediate operative positions for downwardly facing surface 54 to locate on step 40*b*. Nib 62 of receiver 14 locates on downwardly facing surface 54 such that nib 62 is located behind the lip of abutment 52 to form an arrangement illustrated in FIG. 7C wherein the available volume of receiver 14 for holding fluid, the volume defined by the space between the base of nester 12 and the base of receiver 14, is at a maximum. At the upper operative position, nib 62 prevents rotation of nester 12 when stacked onto receiver 14 or the accidental dislodgement of nester 12. In this orientation, channel groove 46 of nester 12 is aligned with second abutment 52 of receiver 14.

In an alternative embodiment, downwardly facing surface 54 includes a protrusion to receive a notch at an apex of an intrusion on receiver 14.

At the intermediate and upper operative positions, nester 12 is stacked onto receiver 14 without the use of frictional force such that additional force is not required to unwedge the containers for ease of use. This is advantageous in preventing physical injury, particularly when the containers are filled and a person overexerts in an attempt to dislodge the containers.

The three operative positions allow plants in the nester to be exposed to three different fluid levels.

During the initial stages of plant growth, seedlings should be immersed into fluid such as nutrient solution to optimise growth. However, once the seedlings develop roots, the seedlings should be incrementally raised from the fluid to reduce fluid saturation, which may in turn reduce aeration of the roots and may stunt root growth.

Accordingly, at a fixed solution level in receiver 14, positioning nester 12 at the lowered operative position allows maximum contact of growth medium in nester 12 with the fluid. In the lowered operative position, four channel grooves 46 of nester 12 engage four cylindrical instructions 40 of receiver 14 to prevent relative rotation of nester 12 within receiver 14. In certain situations, it allows the growth medium to be fully saturated. Positioning nester 12 at the upper operative position minimises contact of the growth medium with the fluid. In certain situations, it allows drainage of the growth medium. Correspondingly, the intermediate operative position may allow partial immersion of the growth medium in the fluid.

Alternatively, the upper operative position increases the volume of fluid that can be stored while maintaining partial or complete immersion of the growth medium. These arrangements are adaptable to accommodate different planting styles and allow the rate of fluid drainage to be adjusted to control aeration of the plant roots.

The height selection effected by the three operative positions also allows a person to adjust the distance of the plants to the light source. This is important as plants typically require more intense light during the initial stages of growth, thus need to be nearer the light source and have to be distanced from the light source as the plants mature to prevent the leaves from getting damaged by the light intensity. Other factors that require the distance of the plant from the light source to be varied include the plant age and weather conditions.

Upper rim portion 24 improves the strength and robustness of the container and includes handle element 30 for improved portability. Upper rim portion 24 also includes an array of spaced apertures 32 along its circumference to allow the container to be secured by means of ropes, cable, string or the like to a grounded substrate such as a table, platform or the like, or be suspended from the ground. The apertures also serve as a means to tie down plant branches and for installing a trellis for plants to climb on. Additionally, upper rim portion 24 includes a branding portion 34 for advertising or branding purposes.

Rim step portion 28 is a substantially horizontal element along the circumference of side wall 16 for positioning a feeder ring (not shown). Rim step portion 28 is a contiguous face but may be formed by a plurality of faces along the circumference of side wall 16 (FIG. 2).

Stand 64 comprises upper rim 66, side wall 68, lower rim 70 and downwardly opening mouth 72 (FIG. 2). Upper rim 66 provides a flat support surface and central hole 74 that receives, base portion 22 of a receiver 14 such that receiver 14 rests on upper rim 66 of stand 64. Lower rim 70 contacts the ground and provides a stable support arrangement for the assembly. Rib 76 provides increased strength and rigidity to side wall 68 and prevents stand 64 from buckling under the weight of the containers (FIG. 1). The stand can be made from the same materials that can be used for manufacturing the containers. The stand can also be a similar container to either a nester or a receiver with its base removed.

This arrangement allows the nester to be elevated to a suitable working height or to bring the plants closer to the light source. The arrangement also imparts additional stability to the assembly as it provides a wider base area for the assembly to rest on. Additionally, the increased height afforded by the arrangement allows the fluid in the receiver to drain back to the main reservoir.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

Claims defining the invention are as follows:

1. A container for stacking with another container having an alike sidewall for use in hydroponics, the container comprises:

a base; and a side wall extending from the base and defining an opening, the side wall having an inner profile and an outer profile, the inner profile interfits with an outer profile of the other container when the container is in a stacked relationship with the other container, and wherein the inner profile comprises first and second formations located at different heights from the base of the container, and the outer profile of the other container comprises first and second abutments located at different heights from the base of the other container for engaging one of the first and second formations of the container when stacked, and when in use, the container is stackable with the other container in a nesting relationship such that the container forms a receiver and the other container forms a nester that is positioned within the receiver, and the relative positions of the containers is adjustable by rotating the container thereby supporting the nester in at least three operative positions within the receiver, including a lowered operative position, an intermediate operative position in which the first abutment of the nester engages the second formation of the receiver, and an upper operative position in which the second abutment of the nester engages the second formation of the receiver, wherein the intermediate operative position is raised from the lower operative position and the upper operative position is raised form the intermediate operative position.

2. The container of claim 1, wherein the inner profile of the container interfits with the outer profile of the other container when the containers are nested.

3. The container of claim 1, wherein the first and second formations comprise at least one of a groove, a rib, a threading, and a step to engage with one of the first and second abutments when stacked with the other container.

4. The container of claim 1, wherein the first formation is located intermediate to the base of the container and the opening of the container and the second formation is located intermediate to the first formation and the opening of the container.

5. The container of claim 4, wherein the inner profile comprises the first and second formations consecutively arranged about the side wall of the container.

6. The container of claim 4, wherein the first formation is configured to interfit with the first abutment of the nester to prevent rotation of the nester relative to the receiver.

7. The container of claim 6, wherein the second formation is configured to interfit with the second abutment of the nester to prevent rotation of the nester relative to the receiver.

8. The container of claim 1, wherein at least one of the first and second formations comprises spaced intrusions about a circumference of the side wall.

9. The container of claim 1, wherein the first and second abutments includes at least one of a groove, a rib, a threading, and a step that is engaged by one of the first and second formations when nested in an operative position.

10. The container of claim 1, wherein each of the first and second abutments comprises a downwardly facing surface when the container is viewed in an upright orientation and a lip formation extends downwardly from an outer portion of the first and second abutments.

11. The container of claim 10, wherein each of the first and second formations includes a protrusion for locating on the downwardly facing surface such that the protrusion is located behind the lip formation.

12. The container of claim 1, wherein the first abutment is located intermediate to the base of the container and the opening of the container, and the second abutment is located intermediate to the first abutment and the base of the container.

13. The container of claim 12, wherein the outer profile comprises the first and second abutments consecutively arranged about the side wall of the container.

14. The container of claim 13, wherein the first abutment is configured to interfit with the first formation of the receiver to prevent rotation of the nester relative to the receiver.

15. The container of claim 14, wherein the second abutment is configured to interfit with the second formation of the receiver to prevent rotation of the nester relative to the receiver.

16. The container of claim 1, wherein the container comprises adjustable openings that may be opened and closed to allow the container to change between watertight for use as the receiver or non-watertight for use as the nester.

17. The container of claim 1, wherein the container comprises a plurality of openings to permit drainage.

18. A set of containers that comprises at least one receiver and one nester according to claim 1.

19. The container of claim 1, wherein the container forms the receiver in which fluid can be contained, wherein the other container forms the nester in which growth medium for a plant can be located and roots for the plant can extend into fluid contained in the receiver when the nester is positioned within the receiver, thereby allowing the growth medium contained in the nester to be immersed in the fluid of the receiver, wherein the level of immersion decreases from the lower operative position to the intermediate operative position to the upper operative position, and wherein each of the lower, intermediate, and upper operative positions are stable positions.

20. A method of stacking a container with another container, having an alike sidewall, the method comprising:
    stacking the container with the other container in a nesting relationship such that the container forms a receiver and the other container forms a nester that is positioned in a first operative position within the receiver, by engaging one of first and second abutments of an outer profile of a side wall located at different heights from the base of the nester with one of first and second formations of an inner profile of a side wall located at different heights from the base of the receiver, the inner profile of the sidewall of the receiver interfitting with the outer profile of the sidewall of the nester, the side wall of each container extending from the base of each container and defining an opening;
    rotating the nester about a longitudinal axis of the receiver; and
    adjusting the relative positions of the containers by engaging one of the at least two abutments of the outer profile of the nester on one of the at least two formations of the receiver and thereby supporting the nester in at least three operative positions within the receiver, including a lowered operative position, an intermediate operative position in which the first abutment of the nester engages the second formation of the receiver, and an upper operative position in which the second abutment of the nester engages the second formation of the receiver, wherein the intermediate operative position is raised from the lower operative position and the upper operative position is raised from the intermediate operative position.

21. The method of stacking a container of claim 20, wherein engaging one of the first and second formations onto one of the first and second abutments allows the nester to be stacked into the receiver without a friction grip between the nester and the receiver.

22. The method of claim 20, wherein the container forms the receiver in which fluid can be contained, wherein the other container forms the nester in which growth medium for a plant can be located and roots for the plant can extend into fluid contained in the receiver when the nester is positioned within the receiver, thereby allowing the growth medium contained in the nester to be immersed in the fluid of the receiver wherein the level of immersion decreases from the lower operative position to the intermediate operative position to the upper operative position and wherein each of the lower, intermediate, and upper operative positions are stable positions.

23. A set of stackable containers for use in hydroponics, comprising a receiver and a nester having alike side walls, the nester comprising:
    a base including a plurality of openings to permit drainage of fluid therethough; and
    a side wall extending from the base and defining an opening, the side wall having an outer profile comprising first and second abutments located at different heights from the base for engaging one of the first and second formations of the receiver when stacked, each of the first and second abutments comprise a downwardly facing surface when the nester is viewed in an upright orientation and a lip formation extends downwardly from an outer portion of the first and second abutments,
    the receiver comprising:

a water-tight base; and a side wall extending from the base and defining an opening, the side wall having an inner profile comprising first and second formations located at different heights from the base for engaging one of first and second abutments of the nester when stacked, each of the first and second formations includes a protrusion for locating on the downwardly facing surface of the first and second abutments of the nester such that the protrusion is located behind the lip formation of the first and second abutments of the nester, when in use, the containers are stackable in a nesting relationship such that fluid can be contained in the receiver and growth medium can be contained in the nester, the relative positions of the containers is adjustable by rotating the nester thereby supporting the nester in at least three different operative positions with the receiver, including a lowered operative position in which the first formation of the receiver is aligned but not engaged with the first abutment of the nester, an intermediate operative position in which the first abutment of the nester is engaged with the second formation of the receiver and an upper operative position in which the second abutment of the nester is engaged with the second formation of the receiver, wherein the intermediate operative position is raised from the lower operative position and the upper operative position is raised from the intermediate operative position thereby allowing the growth medium contained in the nester to be immersed in the fluid of the receiver wherein the level of immersion decreases from the lowered operative position to the intermediate operative position to the upper operative position.

* * * * *